(12) United States Patent
Reddy et al.

(10) Patent No.: US 12,163,045 B2
(45) Date of Patent: Dec. 10, 2024

(54) PHOTOCHROMIC COMPOSITION WITH POLYOL AND POLY(ANHYDRIDE)

(71) Applicant: TRANSITIONS OPTICAL, LTD., Tuam (IE)

(72) Inventors: Ramaiahgari Reddy, Murrysville, PA (US); Brad S. Veldkamp, Allison Park, PA (US); Anil Kumar, Murrysville, PA (US)

(73) Assignee: Transitions Optical, Ltd., Tuam (IE)

( * ) Notice: Subject to any disclaimer, the term of this patent is extended or adjusted under 35 U.S.C. 154(b) by 463 days.

(21) Appl. No.: 17/638,349

(22) PCT Filed: Aug. 30, 2019

(86) PCT No.: PCT/EP2019/073175
§ 371 (c)(1),
(2) Date: Feb. 25, 2022

(87) PCT Pub. No.: WO2021/037374
PCT Pub. Date: Mar. 4, 2021

(65) Prior Publication Data
US 2022/0325133 A1 Oct. 13, 2022

(51) Int. Cl.
| | | |
|---|---|---|
| *C09D 5/29* | (2006.01) | |
| *C09D 7/63* | (2018.01) | |
| *C09D 7/80* | (2018.01) | |
| *C09D 175/04* | (2006.01) | |
| *G02B 5/23* | (2006.01) | |

(52) U.S. Cl.
CPC ............. *C09D 175/04* (2013.01); *C09D 5/29* (2013.01); *C09D 7/63* (2018.01); *C09D 7/80* (2018.01); *G02B 5/23* (2013.01)

(58) Field of Classification Search
CPC ... C09D 5/29; C09D 7/63; C09D 7/80; C09D 175/04; G02B 5/23
See application file for complete search history.

(56) References Cited

U.S. PATENT DOCUMENTS

| | | |
|---|---|---|
| 2,941,988 A | 6/1960 | Wolf |
| 3,361,706 A | 1/1968 | Meriwether |
| 3,862,989 A | 1/1975 | Hansen |
| 3,896,251 A | 7/1975 | Landucci |
| 4,286,957 A * | 9/1981 | Le Naour-Sene ..... G02C 7/102 351/159.61 |
| 4,798,745 A | 1/1989 | Martz et al. |
| 4,931,220 A | 6/1990 | Haynes et al. |
| 5,143,997 A | 9/1992 | Endo et al. |
| 5,166,345 A | 11/1992 | Akashi et al. |
| 5,236,958 A | 8/1993 | Miyashita |
| 5,239,012 A | 8/1993 | McEntire et al. |
| 5,252,742 A | 10/1993 | Miyashita |
| 5,359,085 A | 10/1994 | Iwamoto et al. |
| 5,488,119 A | 1/1996 | Fischer-Reimann et al. |
| 5,527,879 A | 6/1996 | Nakae et al. |
| 5,645,767 A | 7/1997 | Van Gemert |
| 5,658,501 A | 8/1997 | Kumar et al. |
| 5,821,287 A | 10/1998 | Hu et al. |
| 5,962,617 A | 10/1999 | Slagel |
| 6,113,814 A | 9/2000 | Gemert et al. |
| 6,153,126 A | 11/2000 | Kumar |
| 6,268,055 B1 * | 7/2001 | Walters ............... C09D 163/00 252/586 |
| 6,296,785 B1 | 10/2001 | Nelson et al. |
| 6,313,254 B1 | 11/2001 | Meijs et al. |
| 6,329,491 B1 | 12/2001 | Mormile et al. |
| 6,348,604 B1 | 2/2002 | Nelson et al. |
| 6,353,102 B1 | 3/2002 | Kumar |
| 6,420,452 B1 | 7/2002 | Gunatillake et al. |
| 6,436,525 B1 * | 8/2002 | Welch ................... G03C 1/685 252/582 |
| 6,555,028 B2 | 4/2003 | Walters et al. |
| 6,733,887 B2 | 5/2004 | Okoroafor et al. |
| 6,963,003 B2 | 11/2005 | Qin |
| 7,465,415 B2 | 12/2008 | Wang et al. |
| 7,666,510 B2 | 2/2010 | Stewart |

(Continued)

FOREIGN PATENT DOCUMENTS

| | | |
|---|---|---|
| JP | 2000229974 A | 8/2000 |
| JP | 2008506031 A | 2/2008 |

(Continued)

OTHER PUBLICATIONS

Brown, "vol. III: Photochromism", Techniques in Chemistry, 1971, pp. 789-792, John Wiley and Sons, Inc., New York.

(Continued)

*Primary Examiner* — Bijan Ahvazi
(74) *Attorney, Agent, or Firm* — The Webb Law Firm

(57) ABSTRACT

Provided is a curable photochromic coating composition including (a) a polyol component, (b) a poly(anhydride) having at least three cyclic anhydride groups, (c) a secondary crosslinker, and (d) a photochromic material. The polyol component includes (i) a first polyol having two hydroxyl groups and a hydroxyl equivalent weight of at least 15,000 g/mol and (ii) a second polyol different from the first polyol having at least three hydroxyl groups and a hydroxyl equivalent weight of at least 300 g/mol. The secondary crosslinker is selected from a poly(carbodiimide), an oxazoline-functional material, or mixtures thereof. The present invention also provides an optical article prepared from the curable photochromic coating composition.

14 Claims, No Drawings

(56) References Cited

U.S. PATENT DOCUMENTS

| | | | |
|---|---|---|---|
| 8,153,344 B2 * | 4/2012 | Faler | C08G 18/757 |
| | | | 430/138 |
| 8,242,189 B2 | 8/2012 | Rega | |
| 9,957,394 B2 | 5/2018 | Zhou et al. | |
| 2005/0127336 A1 | 6/2005 | Kim et al. | |
| 2006/0093844 A1 | 5/2006 | Conklin et al. | |
| 2006/0141228 A1 * | 6/2006 | Rearick | C08G 18/4854 |
| | | | 428/212 |
| 2007/0122626 A1 | 5/2007 | Qin et al. | |
| 2019/0185700 A1 | 6/2019 | Shaffer et al. | |

FOREIGN PATENT DOCUMENTS

| | | | | |
|---|---|---|---|---|
| WO | 9705213 A1 | 2/1997 | | |
| WO | 2009052109 A1 | 4/2009 | | |
| WO | WO2009051209 A1 * | 4/2009 | | C08G 18/4045 |

OTHER PUBLICATIONS

Wagner et al., "α,ω-Diisocyanatocarbodiimides, -Polycarbodiimides, and Their Derivatives", Angew. Chem. Int. Ed. Engl., Oct. 1981, pp. 819-830, vol. 20:10.

* cited by examiner

PHOTOCHROMIC COMPOSITION WITH POLYOL AND POLY(ANHYDRIDE)

CROSS REFERENCE TO RELATED APPLICATIONS

This application is the United States national phase of International Application No. PCT/EP2019/073175 filed Aug. 30, 2019, the disclosure of which is hereby incorporated by reference in its entirety.

FIELD

The present invention relates to photochromic coating compositions, which include a polyol component and a poly(anhydride), and optical articles that include such photochromic coating compositions.

BACKGROUND

Photochromic compounds undergo a transformation from one state (or form) to another state in response to certain wavelengths of electromagnetic radiation (e.g., "actinic radiation"). Each state has a characteristic absorption spectrum. For example, many photochromic compounds transform from an unactivated (e.g., bleached or substantially colorless) state to an activated (e.g., tinted) state upon exposure to actinic radiation. When the actinic radiation is removed, the photochromic compounds reversibly transform from the activated state back to the unactivated state.

Photochromic compounds can be used in curable compositions to form, for example, cured layers, such as cured films or sheets that are photochromic. With cured photochromic coatings, it is typically desirable that they provide a combination of hardness and photochromic performance. Generally, the kinetics associated with the reversible transformation of a photochromic compound between a closed-form (unactivated/colorless) and an open-form (activated/colored) is faster in a soft matrix, but slower in a hard matrix (of the cured coating in which the photochromic compound resides). Cured photochromic coatings having a soft matrix typically have reduced hardness, while those having a hard matrix typically have increased hardness.

It would be desirable to develop a photochromic coating composition that provides a cured photochromic coating having a combination of improved photochromic performance and sufficient hardness.

SUMMARY

The present invention is directed to a curable photochromic coating composition comprising (a) a polyol component, wherein the polyol component comprises (i) a first polyol having two hydroxyl groups and a hydroxyl equivalent weight of at least 15,000 g/mol and (ii) a second polyol different from the first polyol, said second polyol having at least three hydroxyl groups and a hydroxyl equivalent weight of at least 300 g/mol; (b) a poly(anhydride) having at least three cyclic anhydride groups; (c) a secondary crosslinker, wherein the secondary crosslinker is selected from the group consisting of a poly(carbodiimide), an oxazoline-functional material, and mixtures thereof; and (d) a photochromic material.

The present invention also provides an optical article comprising the photochromic coating composition.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

DETAILED DESCRIPTION

As used herein, the articles "a", "an", and "the" include plural referents unless otherwise expressly and unequivocally limited to one referent. As used herein, the term "includes" is synonymous with "comprises".

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

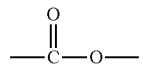

or equivalently —C(O)O—, is inclusive of the right-to-left representation thereof,

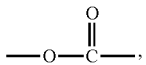

or equivalently —O(O)C— or —OC(O)—.

Other than in the operating examples, or where otherwise indicated, all numbers expressing quantities of ingredients, reaction conditions, and so forth used in the specification and claims are to be understood as modified in all instances by the term "about". By "about" is meant plus or minus twenty-five percent of the stated value, such as plus or minus ten percent of the stated value. However, this should not be considered as limiting to any analysis of the values under the doctrine of equivalents.

As used herein, molecular weight values of polymers, such as weight average molecular weights (Mw) and number average molecular weights (Mn), are expressed in units g/mol and are determined by art-recognized methods. Number average molecular weights of the polyols and polyanhydrides, as described herein, are measured by SEC-TD (triple detection size exclusion chromatography) with a Waters 2695 separation module having a Wyatt Technology Light Scattering detector (miniDAWN), a differential refractive index detector (Optilab rEX) and a Differential Viscometer detector (Viscostar). Tetrahydrofuran (THF) was used as the eluent at a flow rate of 1 ml/min. Three PL Gel Mixed C columns were used. Number average molecular weights (Mn) of the polyols, such as acrylic polyols, as described herein may also be determined by gel permeation chromatography with THF eluent using polystyrene standards. Number average molecular weights (Mn) of the polyols, such as the second polyol(ii), as described herein may also be determined according to $^1$H NMR spectroscopy.

As used herein, "hydroxyl equivalent weight" refers to the mass of a polyol per mole hydroxyl group, expressed in g/mol hydroxyl group. The hydroxyl equivalent weight can be determined by dividing the number average molecular weight (Mn) of the polyol by the average number of hydroxyl groups in the polyol. Hydroxyl equivalent weight can also be determined by mathematical conversion of the hydroxyl value to hydroxyl equivalent weight.

As used herein, "oxazoline equivalent weight" refers to the mass of an oxazoline-functional material per mole oxazoline group, expressed in g/mol oxazoline group. As used herein, "carbodiimide equivalent weight" refers to the mass of a poly(carbodiimide) per mole carbodiimide group, expressed in g/mol carbodiimide group.

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means derivatives of acrylic acid and methacrylic acid, inclusive of acrylate esters, methacrylate esters, acrylamides, methacrylamides, acrylic acid and methacrylic acid. As used herein, the term "(meth)acrylic acid" means methacrylic acid and/or acrylic acid.

The photochromic compounds of the present invention are also referred to herein as photochromic-dichroic compounds (such as, when they include one or more mesogen-containing groups).

As used herein, the term "photochromic" and similar terms, such as "photochromic compound" means having an absorption spectrum for at least visible radiation that varies in response to absorption of at least actinic radiation. Further, as used herein, the term "photochromic material" means any substance that is adapted to display photochromic properties (such as, adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as will be discussed in further detail herein.

As used herein, the term "dichroic" means capable of absorbing one of two orthogonal plane polarized components of at least transmitted radiation more strongly than the other.

As used herein, the term "photochromic-dichroic" and similar terms, such as "photochromic-dichroic compound", means possessing and/or providing both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other).

As used herein, and unless stated otherwise or otherwise limited, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state,", to a second state, for example a "colored state", in response to actinic radiation, and reverting back to the first state in response to thermal energy. The term "non-thermally reversible photochromic compounds/materials" as used herein means compounds/materials capable of converting from a first state, for example a "clear state", to a second state, for example a "colored state", in response to actinic radiation, and reverting back to the first state in response to actinic radiation of substantially the same wavelength(s) as the absorption(s) of the colored state (e.g., discontinuing exposure to such actinic radiation).

As used herein, to modify the term "state", the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, the photochromic compounds of the present invention can have a different absorption spectrum in each of the first and second state. For example, while not limiting herein, a photochromic compound of the present invention can be clear in the first state and colored in the second state. Alternatively, a photochromic compound of the present invention can have a first color in the first state and a second color in the second state.

As used herein, the term "optical" means pertaining to or associated with light and/or vision. For example, the optical article or element or device can be chosen from ophthalmic articles, elements and devices; display articles, elements and devices; windows; mirrors; or active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein, the term "display" means the visible or machine-readable representation of information in words, numbers, symbols, designs or drawings. Non-limiting examples of display elements include screens, monitors, and security elements, such as security marks.

As used herein, the term "window" means an aperture adapted to permit the transmission of radiation therethrough. Non-limiting examples of windows include automotive and aircraft transparencies, windshields, filters, shutters, and optical switches.

As used herein, the term "mirror" means a surface that specularly reflects a large fraction of incident light.

As used herein, the term "liquid crystal cell" refers to a structure containing a liquid crystal material that is capable of being ordered. A non-limiting example of a liquid crystal cell element is a liquid crystal display.

As used herein, the terms "formed over", "deposited over", "provided over", "applied over", "residing over", or "positioned over" mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

The terms "curable", "cure", and the like, as used in connection with the photochromic coating composition, mean that at least a portion of the components that make up the coating composition are polymerizable and/or crosslinkable. The coating composition of the present invention can be cured at ambient conditions, with heat, or with other means such as actinic radiation. The term "ambient conditions" refers to the conditions of the surrounding environment (e.g., the temperature, humidity, and pressure of the room or outdoor environment in which the substrate is located such as, for example, at a temperature of 23° C. and at a relative humidity in the air of 35 percent to 75 percent). The photochromic coating composition can be thermally cured.

The term "alkyl" as used herein means linear or branched, cyclic or acyclic $C_1$-$C_{25}$ alkyl. Linear or branched alkyl can include $C_1$-$C_{25}$ alkyl, such as $C_1$-$C_{20}$ alkyl, such as $C_2$-$C_{10}$ alkyl, such as $C_1$-$C_{12}$ alkyl, such as $C_1$-$C_6$ alkyl. Examples of alkyl groups from which the various alkyl groups of the present invention can be selected from, include, but are not limited to, those recited further herein. Alkyl groups can include "cycloalkyl" groups. The term "cycloalkyl" as used herein means groups that are appropriately cyclic, such as, but not limited to, $C_3$-$C_{12}$ cycloalkyl (including, but not limited to, cyclic $C_5$-$C_7$ alkyl, or cyclic $C_3$-$C_{10}$ alkyl) groups. Examples of cycloalkyl groups include, but are not limited to, those recited further herein. The term "cycloalkyl" as used herein also includes bridged ring polycycloalkyl groups (or bridged ring polycyclic alkyl groups), such as, but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "aryl group", as used herein, refers to an aromatic cyclic monovalent hydrocarbon radical, and the term "aromatic" refers to a cyclically conjugated hydrocarbon with a stability (due to delocalization) that is significantly greater than that of a hypothetical localized structure. Examples of aryl groups include $C_6$-$C_{14}$ aryl groups, such as, but not limited to, phenyl, naphthyl, phenanthryl, and anthracenyl.

The term "carbodiimide group" as used herein refers to a functional group which includes the formula RN=C=NR, wherein R is an alkyl or aryl group.

The term "oxazoline group" as used herein refers to functional group which includes an oxazoline, which is a five-membered heterocyclic chemical compound containing one nitrogen atom and one oxygen atom. The oxazoline group may include 2-oxazoline which is depicted in Formula (I).

(I)

All documents or portions of documents, such as but not limited to issued patents and patent applications, referred to herein, and unless otherwise indicated, are to be considered to be "incorporated by reference" in their entirety.

As used herein, "at least one of" is synonymous with "one or more of", whether the elements are listed conjunctively or disjunctively. For example, the phrases "at least one of A, B, and C" and "at least one of A, B, or C" each mean any one of A, B, or C, or any combination of any two or more of A, B, or C. For example, A alone; or B alone; or C alone; or A and B; or A and C; or B and C; or all of A, B, and C.

As used herein, "selected from" is synonymous with "chosen from", whether the elements are listed conjunctively or disjunctively. Further, the phrases "selected from A, B, and C" and "selected from A, B, or C" each mean any one of A, B, or C, or any combination of any two or more of A, B, or C. For example, A alone; or B alone; or C alone; or A and B; or A and C; or B and C; or all of A, B, and C.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

As used herein, open-ended terms such as "comprising" or "including" are intended to encompass closed-ended terms such as "consisting of" and "consisting essentially of". The invention comprises, consists of, or consists essentially of, the following aspects of the invention, in any combination.

As previously mentioned, the curable photochromic coating composition according to the present invention includes (a) a polyol component. The (a) polyol component may comprise (i) a first polyol having two hydroxyl groups and a hydroxyl equivalent weight of at least 15,000 g/mol, and (ii) a second polyol different from the first polyol, wherein the second polyol has at least three hydroxyl groups and a hydroxyl equivalent weight of at least 300 g/mol.

The (a) polyol component may include (i) a first polyol having at least two hydroxyl groups and a hydroxyl equivalent weight of at least 15,000 g/mol. For purposes of the present invention, the term "polyol" means a molecule having two or more hydroxyl groups. For example, the first polyol (i) can be a diol. As used herein, the term "diol" means a molecule having two hydroxyl groups.

The first polyol (i) can have a hydroxyl equivalent weight of at least 15,000, at least 16,000, at least 17,000, at least 20,000, or at least 22,000 g/mol. Also, the first polyol (i) has a hydroxyl equivalent weight of less than 75,000, such as less than 60,000, less than 50,000, or less than 40,000 g/mol. The first polyol (i), of the polyol component, can have a hydroxyl equivalent weight ranging from 15,000 to 75,000, from 15,000 to 60,000, from 16,000 to 60,000, from 16,000 to 75,000, or from 15,000 to 50,000 g/mol.

The first polyol (i) may have a number average molecular weight (Mn) of at least 30,000, at least 32,000, at least 34,000, at least 40,000, or at least 44,000 g/mol. Also, the first polyol (i) may have a Mn of less than 150,000, less than 100,000, or less than 80,000 g/mol. The first polyol (i), of the polyol component may have a Mn within the range of from 30,000 to 150,000, from 30,000 to 120,000, from 34,000 to 120,000, from 34,000 to 150,000 or from 30,000 to 100,000 g/mol. The first polyol (i) may have a dispersity of from 1.1 to 4.0. The term "dispersity", as used herein, refers to the measure of the molecular weight distribution of a polymer, Mw/Mn, wherein Mw is the weight average molecular weight and Mn is the number average molecular weight.

The first polyol (i) of the polyol component can be selected from any of a number of polyols known in the art provided that the polyol has at least two hydroxyl groups and a hydroxyl equivalent weight of at least 15,000 g/mol. For example, the first polyol (i) can be selected from the group consisting of a polyurethane polyol, a polyether polyol, a polyester polyol, a polycarbonate polyol, an acrylic polyol, a polysiloxane polyol, a poly(urea)urethane polyol, a polyamide polyol, and combinations thereof.

Non-limiting examples of suitable polyurethane polyols are known and can be prepared by reaction of a polyisocyanate with excess organic polyol to form a hydroxyl functional polyurethane polymer. Examples of polyisocyanates useful in the preparation of polyurethane polyols include toluene-2,4-diisocyanate; toluene-2,6-diisocyanate; diphenylmethane-4,4,-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis (isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; dicyclohexylmethane diisocyanate; 1-methylcyclohexane-2,4-diisocyanate; 1-methylcyclohexane-2,6-diisocyanate; cyclohexylene-1,3-diisocyanate; cyclohexylene-1,4-diisocyanate; polymethylene polyphenol isocyanates dicyclohexylmethane-2,4'-diisocyanate; dicyclohexylmethane-4,4,-diisocyanate and mixtures thereof. Examples of organic polyols useful in the preparation of urethane polyols include the other polyols described herein, e.g., polyester polyols, polyether polyols, polycarbonate polyols, amide-containing polyols, polyacrylic polyols, polyhydric polyvinyl alcohols and mixtures thereof.

Non-limiting examples of suitable polyurethane polyols include thermoplastic polyurethanes (TPUs). As used herein, the term "thermoplastic" refers to a polymer which softens or becomes fluid upon heating and solidifies upon cooling, wherein these processes are able to be reversed and repeated without changing the chemical nature of the polymer. Non-limiting examples of suitable thermoplastic polyurethanes include polycarbonate TPUs, polyether TPUs and/ or polyester TPUs, such as polycaprolactone TPUs.

Thermoplastic polyurethanes suitable for use with the photochromic coating composition include aromatic TPUs and aliphatic TPUs. Suitable thermoplastic polyurethanes can include aliphatic thermoplastic polyurethanes with a Shore hardness of less than 90, as measured according to ASTM D2240.

Suitable thermoplastic polyurethanes are also commercially available from The Lubrizol Corporation (Wickliffe, Ohio) under the trade names TECOFLEX, CARBOTHANE, PEARLSTICK, PEARLBOND, PELLETHANE, and ESTANE; from AdvanSource Biomaterials (Wilmington, MA) under the trade names CHRONOFLEX (AL, AR, AR-LT, and C versions) and CHRONOTHANE (P and T); from Covestro AG (Leverkusen, Germany) under the trade names TEXIN and DESMOPAN; from Hunstman Corporation (The Woodland, Texas) under the trade names IROGRAN, AVALON, IROCOAT, KRYSTALFLEX, and KRYSTALGRAN; from BASF SE (Ludwigshafen, Germany) under the trade name ELASTOLLAN; and from Hexpol (Malmo, Sweden) under the trade name DRYFLEX. Non-limiting examples of suitable polysiloxane polyols also can include silicone containing thermoplastic polyurethanes. The polysiloxane can comprise polydimethylsiloxane. Suitable silicone containing thermoplastic polyurethanes are commercially available from AdvanSource Biomaterials (Wilmington, MA) under the trade name CHRONOSIL; and from Aortech International PLC (Dundee, United Kingdom) under the trade name ELAST-EON.

Non-limiting examples of suitable poly(urea)urethane polyols are known and can be prepared by reaction of a polyisocyanate, a polyol, and a polyamine to form a hydroxyl functional poly(urea)urethane polymer. Suitable poly(urea)urethane polyols may also be prepared from an isocyanate functional urea prepolymer with an organic polyol to form a hydroxyl functional poly(urea)urethane polymer. The isocyanate functional urea prepolymer may be formed from the reaction of a polyisocyanate and water. Examples of polyisocyanates and organic polyols useful in the preparation of poly(urea)urethane polyols include the polyisocyanates and polyols described above. The polyamine can be a polyamine having at least two functional groups independently chosen from primary amine (—$NH_2$), secondary amine (—NH—) and combinations thereof. Examples of suitable polyamines can include but are not limited to aliphatic amines, cycloaliphatic amines, aromatic amines and mixtures thereof.

Non-limiting examples of suitable polyether polyols are generally known. Examples of polyether polyols can include various polyoxyalkylene polyols, polyalkoxylated polyols, e.g., poly(oxytetramethylene)diols, and mixtures thereof. The polyoxyalkylene polyols can be prepared, according to well-known methods, by condensing alkylene oxide, or a mixture of alkylene oxides using acid or base catalyzed addition, with a polyhydric initiator or a mixture of polyhydric initiators such as ethylene glycol, propylene glycol, glycerol, sorbitol and the like. Illustrative alkylene oxides include ethylene oxide, propylene oxide, butylene oxide, amylene oxide, aralkylene oxides, e.g., styrene oxide, and the halogenated alkylene oxides such as trichlorobutylene oxide and so forth. The more preferred alkylene oxides include poly(tetrahydrofuran)diol, which is also known as poly(tetramethylene ether) glycol.

Polyester polyols are generally known and can be prepared by conventional techniques utilizing diols, triols and polyhydric alcohols as are well known in the art reacted with polycarboxylic acids. Examples of suitable polycarboxylic acids can include phthalic acid, isophthalic acid, terephthalic acid, trimellitic acid, tetrahydrophthalic acid, adipic acid, succinic acid, glutaric acid, fumaric acid, and mixtures thereof. Anhydrides of the above acids, where they exist, can also be employed and are encompassed by the term "polycarboxylic acid". In addition, certain materials which react in a manner similar to acids to form polyester polyols are also useful. Such materials can include cyclic esters, lactones, e.g., caprolactone, valerolactone, propiolactone and butyrolactone, and hydroxy acids such as hydroxycaproic acid and dimethylol propionic acid. If a triol or polyhydric alcohol is used, a monocarboxylic acid, such as acetic acid and/or benzoic acid, may be used in the preparation of the polyester polyols, and for some purposes, such a polyester polyol may be desirable. Moreover, polyester polyols are understood herein to include polyester polyols modified with fatty acids or glyceride oils of fatty acids (i.e., conventional alkyd polyols containing such modification). Another polyester polyol which may be utilized is one prepared by reacting an alkylene oxide, e.g., ethylene oxide, propylene oxide, etc., and the glycidyl esters of versatic acid with methacrylic acid to form the corresponding ester.

Polycarbonate polyols can be formed by methods known in the art, as disclosed, for example, in U.S. Pat. No. 5,143,997 at column 3, line 43 to column 6, line 25, and U.S. Pat. No. 5,527,879 at column 2, line 10 to column 3, line 48. For example, polycarbonates are customarily obtained from the reaction of alcohols or phenols with phosgene or from the transesterification of alcohols or phenols with dialkyl or diaryl carbonates. Polycarbonate functional polyols may be used that have been prepared by the reaction of a diol such as 1,6-hexanediol, $C_2$ (ethylene glycol) to $C_{36}$ diols such as neopentylglycol, butanediol, 1,10-decanediol, butylethyl propanediol, 2-ethyl-1,3-hexanediol, cyclohexanedimethanol, 2,2,4-trimethylpentane-1,3-diol, Esterdiol 204, and/or polytetrahydrofuran, with either phosgene or dimethylcarbonate.

Acrylic polyols can be prepared from polymerizable ethylenically unsaturated monomers, and are typically copolymers of (meth)acrylic acid or esters and hydroxylalkyl (meth)acrylic acid or esters. Non-limiting examples of suitable polymerizable ethylenically unsaturated monomers include (meth)acrylic acid, alkyl esters of (meth)acrylic acid such as methyl (meth)acrylate, ethyl (meth)acrylate, butyl (meth)acrylate and 2-ethyl hexylacrylate, and vinyl aromatic compounds such as styrene, alpha-methyl styrene, and vinyl toluene. Non-limiting examples of suitable hydroxylalkyl (meth)acrylic acids or esters include hydroxyethyl (meth)acrylate, hydroxypropyl (meth)acrylate, hydroxycyclohexyl (meth)acrylate, 6-hydroxyhexyl (meth)acrylate, and 12-hydroxydodecyl (meth)acrylate. A particularly suitable acrylic polyol can comprise, for example, from 30 to 50 weight percent of an alkyl (meth)acrylic ester, from 40 to 60 weight percent of an hydroxylalkyl (meth)acrylic ester, and from 1 to 10 weight percent of (meth)acrylic acid.

Silicon-containing polyols can be used such as hydroxyl terminated silicon-urethane copolymers which can include the reaction product(s) of a one-step reaction of reactants comprising a diisocyanate, a polycarbonate diol, a polysiloxane a $C_2$-$C_8$ diol chain extender and, optionally, a monofunctional siloxane chain terminator. Preparation of such hydroxyl terminated silicon-containing copolymers is described in detail in U.S. Pat. No. 8,242,189 B2 at column 2, line 49 to column 7, line 55, which is incorporated by reference herein. The preparation of hydroxyl terminated silicon-containing copolymers is also described in detail in U.S. Pat. No. 6,313,254 B1 column 2, line 58 to column 8 line 40. Also, suitable silicon-containing polyols can include the silicon-containing diols described in detail in U.S. Pat. No. 6,420,452 B1 at column 2, line 47 to column 5, line 7, which is incorporated by reference herein.

Polyamide polyols and the preparation thereof are known. For example, amide-containing polyols may be prepared by the reaction of neopentyl glycol, adipic acid, and hexamethylenediamine. The polyamide polyols may also be prepared through aminolysis by the reaction, for example, of carboxylates, carboxylic acids, or lactones with amino alcohols. Examples of suitable diamines and amino alcohols include hexamethylenediamines, ethylenediamines, phenylenediamine, monoethanolamine, diethanolamine, isophorone diamine, and the like.

The first polyol (i) of the polyol component may comprise a linear polyol having pendant and/or terminal hydroxyl groups, such as a linear diol. For example, the first polyol (i) can comprise a linear polyether diol, a linear polyester diol, a linear polyurethane diol, a polycarbonate diol and/or copolymers thereof.

The first polyol (i) of the polyol component may comprise a thermoplastic polyol. For example, the first polyol (i) can comprise a thermoplastic polyurethane (TPU) polyol, such as a TPU diol. The first polyol (i) can comprise a polycarbonate TPU polyol, such as a polycarbonate TPU diol. Additionally, the first polyol (i) can comprise a polyether TPU polyol, such as a polyether TPU diol.

The first polyol (i) of the polyol component can include mixtures or combinations of any of the thermoplastic polyols described above as well as copolymers thereof.

The (a) polyol component comprises (ii) a second polyol having at least three hydroxyl groups and a hydroxyl equivalent weight of at least 300 g/mol. The second polyol (ii) is a different polyol from the first polyol (i).

For example, the second polyol (ii) can be a triol. As used herein, the term "triol" refers to a molecule having three hydroxyl groups. For example, the second polyol (ii) can be a tetraol. As used herein, the term "tetraol" refers to a molecule having four hydroxyl groups.

The second polyol (ii) can have a hydroxyl equivalent weight of at least 300, at least 400, or at least 450 g/mol. Also, the second polyol (ii) can have a hydroxyl equivalent weight of less than 8,000, or less than 3,500 g/mol. The second polyol (ii) of the polyol component can have a hydroxyl equivalent weight of from 300 to 8,000, from 400 to 8,000, or from 450 to 3,500 g/mol.

Further, the second polyol (ii) may have a number average molecular weight (Mn) of at least 900, at least 1,200, or at least 1,350 g/mol. Also, the second polyol (ii) may have a Mn of less than 32,000, or less than 14,000 g/mol. The second polyol (ii) of the polyol component may have a Mn within the range of from 900 to 32,000, from 1,200 to 32,000, or from 1,350 to 14,000 g/mol.

The second polyol (ii) of the polyol component can be selected from any of a number of polyols known in the art provided that the polyol has at least three hydroxyl groups and a hydroxyl equivalent weight is at least 300 g/mol. For example, the second polyol (ii) can be selected from the group consisting of a polyurethane polyol, a polyether polyol, a polyester polyol, a polycarbonate polyol, an acrylic polyol, a polydimethylsiloxane polyol, a poly(urea)urethane polyol, a polyamide polyol, and combinations thereof.

The second polyol (ii) of the polyol component (a) may comprise a branched polyol or a dendritic polyol having pendant and/or terminal hydroxyl groups. The second polyol (ii) can comprises a dendritic polyester and/or a dendritic polycarbonate. Also, the second polyol (ii) may comprise a linear polyol having pendant and/or terminal hydroxyl groups.

Further, the second polyol (ii) can comprise a polyester triol, a polyester tetraol, or mixtures thereof. The second polyol (ii) can comprise poly(caprolactone) segments. For example, the second polyol (ii) may comprise poly(caprolactone)triol, poly(caprolactone)tetraol, or mixtures thereof. The second polyol (ii) can comprise a polycarbonate triol, a polycarbonate tetraol, or mixtures thereof. Also, the second polyol (ii) can comprise an acrylic polyol.

The polyol component (a) can comprise at least 10 weight percent, at least 25 weight percent, at least 30 weight percent, at least 40 weight percent, at least 50 weight percent, at least 60 weight percent, or at least 70 weight percent of the photochromic coating composition, based on the total solids weight of the coating composition. The polyol component (a) can comprise up to 60 weight percent, up to 75 weight percent, up to 79.9 weight percent, up to 90 weight percent, or up to 95 weight percent of the coating composition, based on the total solids weight of the coating composition. The polyol component (a) also can comprise an amount within a range such as from 10 to 95 weight percent, from 25 to 79.9 weight percent, from 30 to 79.9 weight percent, from 40 to 79.9 weight percent, from 50 to 79.9 weight percent, or from 55 to 70 weight percent of the coating composition, based on the total solids weight of the coating composition.

The first polyol (i) of the polyol component (a) can comprise at least 10 weight percent, at least 25 weight percent, at least 30 weight percent, at least 40 weight percent, or at least 50 weight percent of the photochromic coating composition, based on the total solids weight of the coating composition. The first polyol (i) can comprise up to 50 weight percent, up to 60 weight percent, or up to 75 weight percent, up to 79.9 weight percent, up to 90 weight percent, or up to 95 weight percent of the coating composition, based on the total solids weight of the coating composition. The first polyol (i) can also comprise an amount within a range such as from 10 to 95 weight percent, from 25 to 79.9 weight percent, from 30 to 79.9 weight percent, from 30 to 60 weight percent, or from 35 to 50 weight percent of the coating composition, based on the total solids weight of the coating composition. Further, the photochromic coating composition can comprise a larger weight percent of the first polyol (i) than the second polyol (ii).

The second polyol (ii) of the polyol component (a) can comprise at least 5 weight percent, at least 10 weight percent, at least 25 weight percent, at least 30 weight percent, at least 40 weight percent, or at least 50 weight percent of the photochromic coating composition, based on the total solids weight of the coating composition. The second polyol (ii) can comprise up to 40 weight percent, up to 60 weight percent, up to 75 weight percent, up to 79.9 weight percent, up to 90 weight percent, or up to 95 weight percent of the coating composition, based on the total solids weight of the coating composition. The second polyol (ii) also can comprise an amount within a range such as from 5 to 95 weight percent, from 10 to 79.9 weight percent, from 10 to 50 weight percent, from 10 to 40 weight percent, from 10 to 30 weight percent, or from 15 to 30 weight percent of the coating composition, based on the total solids weight of the coating composition.

The curable photochromic coating composition according to the present invention also includes (b) a poly(anhydride) having at least three cyclic anhydride groups. For the purposes of the present invention, "poly(anhydride)" refers to a molecule having multiple anhydride groups.

The poly(anhydride) (b) can be prepared by free-radical initiated addition polymerization of an ethylenically unsaturated monomer having anhydride functionality such as maleic anhydride, citraconic anhydride, itaconic anhydride, propenyl succinic anhydride and the like, with other ethylenically unsaturated monomers substantially free of anhydride functionality. Examples of such ethylenically unsaturated materials can include, but are not limited to, esters of (meth)acrylic acids, such as methyl acrylate, methyl methacrylate, butyl acrylate and butyl methacrylate; vinyl compounds such as vinyl acetate and vinyl chloride; styrene-based materials such as styrene itself and alpha-methylstyrene; allyl compounds such as allyl chloride and allyl acetate and other co-polymerizable ethylenically unsaturated monomers such as acrylonitrile and methacrylonitrile, amides such as acrylamide and methacrylamide, dienes such as 1,3-butadiene, $C_2$-$C_{24}$ olefins, and mixtures of such ethylenically unsaturated materials.

A "cyclic anhydride", as used herein, refers to a molecule comprising at least one closed ring structure, wherein the closed ring structure comprises an anhydride group. The poly(anhydride) (b) may comprise at least three cyclic anhydride groups per molecule. The poly(anhydride) (b) comprising at least three cyclic anhydride groups may be prepared from a cyclic anhydride monomer, such as maleic anhydride.

The poly(anhydride) (b) may comprise a copolymer of maleic anhydride. The poly(anhydride) (b) can comprise at least one copolymer selected from the group consisting of a copolymer of maleic anhydride and a $C_2$-$C_{24}$ olefin, a copolymer of maleic anhydride and (meth)acrylate, a copolymer of maleic anhydride and styrene or a derivative thereof, and mixtures thereof. The poly(anhydride) (b) can comprise a copolymer of maleic anhydride and a $C_2$-$C_{24}$ olefin, such as a $C_{10}$-$C_{24}$ olefin, a $C_{10}$-$C_{20}$ olefin, a $C_{15}$-$C_{24}$ olefin, or a $C_{15}$-$C_{20}$ olefin. For example, the poly(anhydride) (b) may comprise a copolymer of maleic anhydride and 1-octadecene.

The poly(anhydride) (b) may have a number average molecular weight (Mn) of at least 500, at least 1,000, at least 5,000, at least 10,000, or at least 25,000 g/mol. With some embodiments, the poly(anhydride) (b) may have a Mn of less than 100,000, less than 75,000, less than 60,000, or less than 50,000 g/mol. The poly(anhydride) (b), with some embodiments, may have a Mn within the range of from 500 to 100,000, from 1,000 to 100,000, from 5,000 to 75,000, from 10,000 to 60,000, from 25,000 to 60,000, or from 25,000 to 50,000 g/mol.

The poly(anhydride) component (b) can comprise at least 1 weight percent, at least 5 weight percent, at least 10 weight percent, at least 15 weight percent, at least 20 weight percent, at least 25 weight percent, or at least 30 weight percent of the photochromic coating composition, based on the total solids weight of the coating composition. The poly(anhydride) component (b) can comprise up to 30 weight percent, up to 40 weight percent, up to 45 weight percent, up to 50 weight percent, up to 55 weight percent, or up to 60 weight percent of the coating composition, based on the total solids weight of the coating composition. The poly(anhydride) component (b) can also comprise an amount within a range such as from 1 to 60 weight percent, from 5 to 55 weight percent, from 10 to 55 weight percent, from 10 to 50 weight percent, or from 10 to 30 weight percent of the coating composition, based on the total solids weight of the coating composition.

The photochromic coating composition may have a ratio of equivalents of anhydride groups present in the poly(anhydride) (b) to the equivalents of hydroxyl groups present in the polyol component (a) in a range of from 0.1:1 to 10:1, from 1:4 to 20:1, from 1:2 to 10:1, from 1:3 to 5:1, from 1:2 to 4:1, from 1:1 to 5:1, from 1:1.5 to 1.5:1, or about 1:1.

As indicated, the curable photochromic coating composition according to the present invention also includes (c) a secondary crosslinker. A "crosslinker", as used herein, refers to a molecule comprising two or more functional groups that are reactive with other functional groups and which is capable of linking two or more monomers or polymer molecules through chemical bonds. It will be appreciated that the photochromic coating composition of the present invention can cure through the reaction between the hydroxyl groups of the polyol component (a) and the anhydride groups of the poly(anhydride) (b), which results in the formation of ester bonds and carboxylic acid groups. The secondary crosslinker allows for further crosslinking to occur between the carboxylic acid groups and the functional groups of the secondary crosslinker(s). The secondary crosslinker (c) may also provide increased mechanical strength and hardness of the photochromic coating composition.

The secondary crosslinker (c) may be selected from the group consisting of poly(carbodiimide) and oxazoline-functional material. For the purposes of the present invention, a "poly(carbodiimide)" refers to a molecule having at least two carbodiimide groups, or a polymer containing two or more units having the structure: —N═C═N—. For the purposes of the present invention, an "oxazoline-functional material", refers to a molecule having at least two oxazoline groups.

The secondary crosslinker (c) can comprise an oxazoline-functional material having at least three oxazoline groups. Also, the secondary crosslinker (c) can comprise a poly (carbodiimide) having at least three carbodiimide groups.

Non-limiting examples of suitable oxazoline-functional material crosslinkers include 1,2-phenylene-bis-(2-oxazoline); 1,3-phenylene-bis-(2-oxazoline); 1,4-phenylene-bis-(2-oxazoline); 1,2-bis(oxazolinyl-4-methyl)benzene; 1,3-bis(oxazolinyl-4-methyl)benzene; 1,4-bis(oxazolinyl-4-methyl)benzene; 1,2-bis(oxazolinyl-5-ethyl)benzene; 1,3-bis(oxazolinyl-5-methyl)benzene 1,3-bis(oxazolinyl-5-ethyl)benzene; 1,4-bis(oxazolinyl-5-ethyl)benzene; 1,2,4-tris(oxazolinyl)benzene; 1,3,5-tris(oxazolinyl)benzene; 1,2,4,5 tetrakis(oxazolinyl)benzene; ortho-, meta- or para-substituted phenylenebisoxazolines, 2,6-bis(2-oxazolin-2-yl)pyridine (and also derivatives with alkyl or aryl substituents on the oxazoline ring), 2,6-bis(8H indeno1,2-dioxazolin-2-yl)pyridine, 1.2-bis(4,4-dimethyl 2-oxazolin-2-yl)ethane (and also derivatives with alkyl or aryl substituents on the oxazoline ring), 2.2-isopropylidenebis-2-oxazoline (and also derivatives with alkyl or aryl substituents on the oxazoline ring) and also copolymers consisting of 2-isopropenyl-2-oxazoline such as Epocros™ RP-5, RP-6 and RPS-1005 from Nippon Shokubai. The other co-polymers of polymerizable 2-isopropenyl-2-oxazoline with ethylenically unsaturated materials can include, but are not limited to, esters of (meth)acrylic acids, such as methyl acrylate, methyl methacrylate, butyl acrylate and butyl methacrylate; vinyl compounds such as vinyl acetate and vinyl chloride; styrene-based materials such as styrene itself and alpha-methylstyrene; allyl compounds such as allyl chloride and allyl acetate and other co-polymerizable ethylenically unsaturated monomers such as acrylonitrile and methacrylonitrile, amides such as acrylamide and methacrylamide, dienes such as 1,3-butadiene, $C_2$-$C_{24}$ olefins, and mixtures of such ethylenically unsaturated materials. Non-limiting examples of suitable oxazoline-functional material crosslinkers also include those described in U.S. Patent Publication No. 2019/0185700A1 at paragraphs [0026] to [0042], which is incorporated herein by reference.

The secondary crosslinker (c) may comprise an oxazoline-functional material having an oxazoline equivalent weight within the range of from 70 to 10,000, from 100 to 5,000 g/mol, or from 100 to 1,000 g/mol.

Also, the secondary crosslinker (c) may comprise a oxazoline-functional material having a number average molecular weight (Mn) within the range of from 140 to 200,000, from 200 to 100,000 g/mol, or from 250 to 10,000 g/mol.

Non-limiting examples of suitable poly(carbodiimide) crosslinkers include those described in U.S. Pat. No. 9,957, 394B2 at column 4, line 11 to column 5, line 63, which is incorporated herein by reference. The polycarbodiimides can generally be prepared by a condensation reaction of a polyisocyanate in the presence of a suitable catalyst to form a polycarbodiimide intermediate having terminal NCO-functionalities and by terminating and/or chain extending the polycarbodiimide intermediate by the addition of one or more active hydrogen-containing compounds, such as an amine and/or a hydroxy-containing compound.

Suitable polyisocyanates for the condensation reaction, include, without limitation, aliphatic, including cycloaliphatic, polyisocyanates. Such polyisocyanates can contain, for example, from 2 to 4, such as 2 isocyanate groups per molecule. Examples of suitable aliphatic and cycloaliphatic diisocyanates are methylene-bis(4-cyclohexylisocyanate), isophorone diisocyanate, 1,4-cyclohexyl diisocyanate, 1,3-bis(isocyanatomethyl)cyclohexane, meta-tetramethylxylene diisocyanate ("TMXDI"), and/or mixtures thereof. Substituted polyisocyanates can also be used in which the substituents are nitro, chloro, alkoxy and other groups that are not reactive with hydroxyl groups or active hydrogens and provided the substituents are not positioned to render the isocyanate group unreactive.

The polyisocyanate can be an NCO-containing adduct such as would be formed, for example, when an active hydrogen-containing compound is present before or during polycarbodiimide formation, as described below.

The foregoing polycarbodiimide polymers can be made by any of a variety of methods starting from a polycarbodiimide intermediate having terminal NCO-functionalities. Moreover, the polycarbodiimide polymers can be produced from a polycarbodiimide intermediate made with or without use of an active hydrogen-containing chain extender.

The active hydrogen-containing chain extender is a spacer linking polyisocyanates together or linking isocyanate functional polycarbodiimides together, depending upon when the active hydrogen compound is added. For example, the chain extender can be added before, during, or after formation of the polycarbodiimide intermediate having terminal NCO-functionalities.

Any suitable compound containing active hydrogens may be used as the chain extender, if a chain extender is employed. The term "active hydrogen atoms" refers to hydrogens which, because of their position in the molecule, display activity according to the Zerewitinoff test. Accordingly, active hydrogens include hydrogen atoms attached to oxygen, nitrogen, or sulfur, and thus useful compounds will include those having at least two hydroxyl, thiol, primary amine, and/or secondary amine groups (in any combination). For example, the active hydrogen-containing chain extender contains from 2 to 4 active hydrogens per molecule.

Examples of such compounds containing active hydrogens include alcohols, which include polyols, amines, which includes polyamines, aminoalcohols, and mercapto-terminated derivatives. With some embodiments, the compounds containing active hydrogen materials may include low molecular weight polyols having an average of two or more hydroxyl groups per molecule and exclude high molecular weight polyols including polyethoxy or polypropoxy groups (e.g., polyethylene glycol). By "low molecular weight materials" it is meant compounds having weight average molecular weights (Mw) ranging from 0 to 1000 g/mol, such as 10 to 500 g/mol or 20 to 300 g/mol or 30 to 200 g/mol, or 50 to 150 g/mol. Suitable polyols include low molecular weight diols, triols and higher alcohols, and low molecular weight amide-containing polyols. The low molecular weight diols, triols and higher alcohols include cycloaliphatic polyols such as 1,2-cyclohexanediol and cyclohexane dimethanol, aliphatic polyols, particularly alkylene polyols containing from 2 to 18 carbon atoms. Examples include ethylene glycol, 1,4-butanediol, 1,6-hexanediol. Examples of triols and higher alcohols include trimethylol propane, glycerol and pentaerythritol. Such chain extended polycarbodiimides comprise urethane linkages.

As mentioned above, to prepare a polycarbodiimide, an isocyanate terminated polycarbodiimide intermediate is first formed by condensation reaction of a polyisocyanate, which may or may not have been previously chain extended by the reaction of a polyisocyanate with an active-hydrogen containing chain extender of the type previously described. The polyisocyanate is condensed with the elimination of carbon dioxide to form the isocyanate terminated polycarbodiimide.

The condensation reaction is typically conducted by taking the solution of a polyisocyanate and heating in the presence of suitable catalyst. Such reaction is described, for example by K. Wagner et al., Angew. Chem. Int. Ed. Engl., vol. 20, p. 819-830 (1981). Representative examples of suitable catalysts are described in e.g. U.S. Pat. Nos. 2,941,988, 3,862,989 and 3,896,251, the disclosures of which are hereby incorporated by reference. Examples include 1-ethyl-3-phospholine, 1-ethyl-3-methyl-3-phospholine-1-oxide, 1-ethyl-3-methyl-3-phospholine-1-sulfide, 1-ethyl-3-methyl-phospholidine, 1-methylphospholen-1-oxide, 1-ethyl-3-methyl-phospholidine-1-oxide, 3-methyl-1-phenyl-3-phospholine-1-oxide and bicyclic terpene alkyl or hydrocarbyl aryl phosphine oxide or camphene phenyl phosphine oxide. The particular amount of catalyst used will depend to a large extent on the reactivity of the catalyst itself and the polyisocyanate being used. A concentration range of 0.05-5 parts of catalyst per 100 parts of polyisocyanate is generally suitable.

Suitable polycarbodiimides are also commercially available from Nisshinbo Chemical Inc. (Tokyo, Japan) under the trade name CARBODILITE.

The secondary crosslinker (c) may comprise a poly(carbodiimide) having a carbodiimide equivalent weight within the range of from 200 to 10,000 g/mol, from 200 to 5,000 g/mol, or from 250 to 1,000 g/mol. Also, the secondary crosslinker (c) may comprise a poly(carbodiimide) having a number average molecular weight (Mn) within the range of from 400 to 300,000 g/mol.

The secondary crosslinker (c) can comprise at least 1 weight percent, at least 3 weight percent, at least 5 weight percent, at least 7 weight percent, at least 10 weight percent, at least 12 weight percent, or at least 15 weight percent of the photochromic coating composition, based on the total solids weight of the coating composition. The secondary crosslinker (c) can comprise up to 50 weight percent, up to 40 weight percent, up to 35 weight percent, up to 30 weight percent, or up to 25 weight percent of the coating composition, based on the total solids weight of the coating composition. The secondary crosslinker (c) also can comprise an amount within a range such as from 1 to 50 weight percent, from 5 to 35 weight percent, from 10 to 30 weight percent, from 5 to 25 weight percent, or from 7 to 30 weight percent of the coating composition, based on the total solids weight of the coating composition.

The photochromic coating composition of the present invention may have a ratio of equivalents of carboxylic acid groups, formed from the reaction of the polyol component (a) and the polyanhydride (b), to the equivalents of oxazoline or carbodiimide groups present in the secondary crosslinker (c), in a range of from 0.1:1 to 10:1, from 1:3 to 5:1, from 1:2 to 4:1, or about 1:1.

As indicated, the photochromic coating composition according to the present invention also includes (d) a photochromic material. As used herein, the term "photochromic material" includes both thermally reversible and non-thermally reversible (or photo-reversible) photochromic compounds. The photochromic material can include any of the art recognized photochromic compounds. The photochromic compounds may be used individually or in combination with other complementary photochromic compounds. Generally, although not limiting herein, when two or more photochromic materials are used in conjunction with each other, the various materials can be chosen to complement one another to produce a desired color or hue. For example, mixtures of photochromic compounds can be used according to certain non-limiting embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

The photochromic material can comprise any of a variety of organic and inorganic photochromic materials. The photochromic material(s) can include but is not limited to the following classes of materials: chromenes, e.g., naphthopyrans, benzopyrans, indenonaphthopyrans, indolenaphthopyrans, phenanthropyrans or mixtures thereof; spiropyrans, e.g., spiro(benzindoline)naphthopyrans, spiro(indoline)benzopyrans, spiro(indoline)naphthopyrans, spiro(indoline)quinopyrans and spiro(indoline)pyrans; oxazines, e.g., spiro(indoline)naphthoxazines, spiro(indoline)pyridobenzoxazines, spiro(benzindoline)pyridobenzoxazines, spiro(benzindoline)naphthoxazines and spiro(indoline)benzoxazines; mercury dithizonates, fulgides, fulgimides and mixtures of such photochromic compounds.

The photochromic material (d) can be selected from the group consisting of naphthopyrans, benzopyrans, indenonaphthopyrans, indolenaphthopyrans, phenanthropyrans, spiropyrans, oxazines, mercury dithiozonates, fulgides, fulgimides, and mixtures thereof.

Such photochromic materials and complementary photochromic materials are described in U.S. Pat. No. 4,931,220 at column 8, line 52 to column 22, line 40; U.S. Pat. No. 5,645,767 at column 1, line 10 to column 12, line 57; U.S. Pat. No. 5,658,501 at column 1, line 64 to column 13, line 17; U.S. Pat. No. 6,153,126 at column 2, line 18 to column 8, line 60; U.S. Pat. No. 6,296,785 at column 2, line 47 to column 31, line 5; U.S. Pat. No. 6,348,604 at column 3, line 26 to column 17, line 15; and U.S. Pat. No. 6,353,102 at column 1, line 62 to column 11, line 64, the disclosures of the aforementioned patents are incorporated herein by reference. Spiro(indoline)pyrans are also described in the text, Techniques in Chemistry, Volume III, "Photochromism", Chapter 3, Glenn H. Brown, Editor, John Wiley and Sons, Inc., New York, 1971.

The photochromic materials can be polymerizable photochromic materials, such as polymerizable naphthoxazines disclosed in U.S. Pat. No. 5,166,345 at column 3, line 36 to column 14, line 3; polymerizable spirobenzopyrans disclosed in U.S. Pat. No. 5,236,958 at column 1, line 45 to column 6, line 65; polymerizable spirobenzopyrans and spirobenzothiopyrans disclosed in U.S. Pat. No. 5,252,742 at column 1, line 45 to column 6, line 65; polymerizable fulgides disclosed in U.S. Pat. No. 5,359,085 at column 5, line 25 to column 19, line 55; polymerizable naphthacenediones disclosed in U.S. Pat. No. 5,488,119 at column 1, line 29 to column 7, line 65; polymerizable spirooxazines disclosed in U.S. Pat. No. 5,821,287 at column 3, line 5 to column 11, line 39; polymerizable polyalkoxylated naphthopyrans disclosed in U.S. Pat. No. 6,113,814 at column 2, line 23 to column 23, line 29; and the polymerizable photochromic compounds disclosed in WO 97/05213 and in U.S. Pat. No. 6,555,028 at column 1, line 16 to column 24, line 56. The disclosures of the aforementioned patents on polymerizable photochromic materials are incorporated herein by reference.

Other suitable photochromic materials can include organo-metal dithiozonates, e.g., (arylazo)-thioformic arylhydrazidates, e.g., mercury dithizonates which are described in, for example, U.S. Pat. No. 3,361,706 at column 2, line 27 to column 8, line 43; and fulgides and fulgimides, e.g., the 3-furyl and 3-thienyl fulgides and fulgimides, which are described in U.S. Pat. No. 4,931,220 at column 1, line 39 through column 22, line 41, the disclosures of which are incorporated herein by reference.

Suitable photochromic materials also can include the polymerizable polyalkoxylated naphthopyrans disclosed in U.S. Pat. No. 6,113,814, at column 2, line 24 to column 23, line 29, the cited portions of which are incorporated herein by reference. Additionally, suitable photochromic materials can include polymeric matrix compatibilized naphthopyran compounds such as those disclosed in U.S. Pat. No. 6,555,028B2 at column 2, line 40 to column 24, line 56, the cited portions of which are incorporated herein by reference.

Further, the photochromic material can comprise a reaction product of at least one ring-opening cyclic monomer comprising a cyclic ester and/or a cyclic carbonate, and a photochromic initiator. Such materials and the preparation thereof are described in detail in U.S. Pat. No. 7,465,415 at column 12, line 27, to column 74, line 64, the cited portions of which are incorporated herein by reference.

The photochromic compounds may be used individually or in combination with other complementary photochromic compounds, i.e., organic photochromic compounds having at least one activated absorption maxima within the range of between about 400 and 700 nanometers, or substances containing same, that may be incorporated, e.g., dissolved or dispersed, in the photochromic coating composition, and which compounds or mixtures of compounds color when activated to an appropriate hue.

The amount of photochromic material present in the photochromic composition of the present invention is generally the amount which is sufficient to exhibit a desired change in optical density when the photochromic coating composition comprising the photochromic material is exposed to actinic (e.g., ultraviolet) radiation. Typically a sufficient amount is used to produce a photochromic effect discernible to the naked eye upon activation. Such amount is often described as a "photochromic amount". The photochromic amount depends upon the intensity of color desired upon exposure to actinic radiation and upon the method used to incorporate the photochromic materials into or onto an optical element.

The photochromic material (d) can comprise at least 0.01 weight percent, at least 0.05 weight percent, at least 0.07 weight percent, at least 0.1 weight percent, at least 0.5 weight percent, or at least 1 weight percent of the photochromic coating composition, based on the total solids weight of the coating composition. The photochromic material (d) can comprise up to 30 weight percent, up to 25 weight percent, up to 20 weight percent, up to 15 weight percent, or up to 10 weight percent of the coating composition, based on the total solids weight of the coating composition. The photochromic material (d) can also comprise an amount within a range such as from 0.01 to 30 weight percent, from 0.05 to 25 weight percent, from 0.1 to 20 weight percent, from 0.1 to 15 weight percent, or from 0.5 to 10 weight percent of the coating composition, based on the total solids weight of the coating composition.

Curable photochromic coating compositions according to the present invention can, optionally, contain additives such as waxes for flow and wetting, flow control agents, e.g., poly(2-ethylhexyl)acrylate, adjuvant resin to modify and optimize coating properties, antioxidants and ultraviolet (UV) light absorbers. Examples of useful antioxidants and UV light absorbers include those available commercially from BASF SE (Ludwigshafen, Germany) under the trade names IRGANOX and TINUVIN. These optional additives, when used, are typically present in amounts up to 20 percent by weight (e.g., from 0.5 to 10 percent by weight), based on total weight of resin solids of the curable resin composition.

Photochromic compositions, photochromic articles and photochromic coating compositions according to the present invention can further include art-recognized additives that aid or assist in the processing and/or performance of the compositions or articles. Non-limiting examples of such additives include photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, adhesion promoters (such as hexanediol diacrylate, (3-glycidoxypropyl)trimethoxysilane, and coupling agents), surface additives (such as silicone-containing surface additives such as dimethylpolysiloxane copolymers) and combinations and mixtures thereof.

The curable photochromic coating composition according to the present invention may also be substantially free, may be essentially free, or may be completely free of an isocyanate functional crosslinker. The term "substantially free" as used in this context means the curable photochromic composition contains less than 1000 parts per million (ppm) of a component based on the total solids weight of the coating composition, "essentially free" means less than 100 ppm of a component based on the total solids weight of the coating composition, and "completely free" means less than 20 parts per billion (ppb) of a component based on the total solids weight of the coating composition.

The curable photochromic compositions of the present invention can further include one or more fixed-tint dyes. As used herein, the term "fixed-tint dye" and related terms, such as "fixed-colorant", "static colorant", "fixed dye", and "static dye", means dyes that are non-photosensitive materials, which do not physically or chemically respond to electromagnetic radiation with regard to the visually observed color thereof. The term "fixed-tint dye" and related terms as used herein does not include and is distinguishable from photochromic compound. As used herein, the term "non-photosensitive materials" means materials that do not physically or chemically respond to electromagnetic radiation with regard to the visually observed color thereof, including, but not limited to, fixed-tint dyes.

One or more fixed-tint dyes can be present in the curable photochromic compositions of the present invention for purposes including, but not limited to, providing a photochromic layer and photochromic article having at least a base (or first) color characteristic of the fixed-tint dye, when the photochromic compound is not activated; and optionally a second color characteristic of the combination of the fixed-tint dye and the photochromic compound when activated, such as by exposure to actinic radiation.

The optional fixed-tint dye of the curable photochromic composition can include at least one of azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, and polyene dyes.

The fixed-tint dye can be present in the curable photochromic composition in varying amounts to provide the intended effect in the cured article prepared therefrom. The fixed-tint dye can be present in the curable photochromic composition in an amount of from 0.001 to 15 percent by weight, or from 0.01 to 10 percent by weight, or from 0.1 to 2.5 percent by weight, the percent weights in each case being based on the total solids weight of the curable photochromic composition (including the weight of the fixed-tint dye; and inclusive of the recited values).

The curable photochromic compositions of the present invention can include solvents, selected from water, organic solvents, and combinations thereof.

Classes of organic solvents that can be present in the curable photochromic compositions of the present invention include, but are not limited to, ketones, such as acetone, and methyl ethyl ketone; ethers, such as dimethyl ether and methyl ethyl ether; cyclic ethers, such as tetrahydrofuran, dioxane, and dihydroevoglucosenone; esters, such as ethyl acetate, ethyl lactate, ethylene carbonate and propylene carbonate; nitrogen containing cyclic compounds, such as pyrrolidone, N-methyl-2-pyrrolidone, N-butyl-2-pyrrolidone, and 1,3-dimethyl-2-imidazolidinone; amides, such as N,N-dimethylformamide, and N,N-dimethylacetamide; sulfur containing compounds, such as dimethyl sulfoxide and tetramethylene sulfone; aromatic compounds, such as toluene, xylene, anisole, and butyl benzoate; and mixtures of aromatic compounds, such as, but not limited to, Aromatic 100 Fluid, which is a commercially available mixture of $C_9$-$C_{10}$ dialkyl- and trialkyl-benzenes.

Solvent(s) can be present in the curable photochromic compositions of the present invention, in an amount of from 20 to 95 percent by weight, or from 50 to 90 percent by weight, or from 60 to 80 percent by weight, in each case based on the total weight of the curable photochromic composition (including the weight of the solvent).

The curable photochromic composition of the present invention can be cured by any suitable methods known in the art. For example, the curable photochromic composition can be cured at (or under) ambient conditions, such as at room temperature of about 25° C. Also, the curable photochromic composition can be cured by exposure to elevated temperature (in excess of ambient room temperature). As used herein, by "cured" is meant a three-dimensional crosslink network is formed by covalent bond formation, such as between the hydroxyl groups of the polyol component (a) and anhydride groups of the poly(anhydride) (b). When cured at elevated temperature, the curable photochromic composition can be referred to herein as a thermosetting curable photochromic composition. The temperature at which the thermosetting curable photochromic composition of the present invention is cured is variable and depends in part on the amount of time during which curing is conducted. For example, the curable photochromic composition can be cured at an elevated temperature of from 100° C. to 130° C., for a period of 60 to 240 minutes.

The curable photochromic coating composition can be applied to (or formed over) a substrate in accordance with art-recognized methods, which include, but are not limited to, extrusion methods; spray application methods; curtain coating application methods; draw-down blade (or bar) application methods; dip-coating application methods; spin-coating application methods; jet printing methods (such as inkjet printing methods, where the "ink" is replaced with a curable photochromic composition according to the present invention); in-mold coating or application methods; and combinations thereof.

Non-limiting examples of suitable substrates include glass and organic materials, provided that they are optically transparent. Non-limiting examples of organic materials that can be used to form the substrate include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include polyol(allyl carbonate) monomers, e.g., allyl diglycol carbonates such as diethylene glycol bis(allyl carbonate), which monomer is sold under the trademark CR-39® by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX® by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN®; polyesters, such as the material sold under the trademark MYLAR®; poly (ethylene terephthalate); polyvinyl butyral; poly(methyl methacrylate), such as the material sold under the trademark PLEXIGLAS®, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

The curable photochromic compositions of the present invention are used to prepare photochromic layers, such as photochromic films (i.e., photochromic coatings) and photochromic sheets. As used herein, the term "film" means a layer that is not self-supporting, such as, but not limited to, a coating. As used herein, the term "sheet" means a layer that is free-standing and self-supporting.

The photochromic coating compositions of the present invention, when applied to a substrate and cured to form a coating thereover, may have a thickness of from 5 to 50 microns, such as from 10 to 30 microns.

The photochromic coating composition, when applied to a substrate and cured to form a coating, may have a Fischer micro-hardness value of at least 10 and less than 50 N/mm² when fully cured, which can be determined in accordance with art-recognized methods. With some embodiments, the Fischer micro-hardness of the cured photochromic layer can be determined using a Fischerscope HCV, Model H100SMC apparatus (available from Fischer Technology, Inc.) at a penetration depth of 2 microns after a 100 millinewton load for 15 seconds, and with units of (N/mm²).

The photochromic performance of the photochromic articles of the present invention can be determined in accordance with art-recognized methods using art-recognized equipment, as described in further detail in the Examples herein.

As used herein, the change in optical density (ΔOD) at saturation is after 15 minutes of activation, and as further described in the examples herein. The Fade Half Life (T½) value is the time interval in seconds for the ΔOD of the activated form of the photochromic material in the photochromic layer to reach one half the fifteen-minute ΔOD at 23° C., after removal of the activating light source, as described in further detail in the Examples herein.

The photochromic optical articles of the present invention may exhibit a $T_{1/2}$ (Fade Half Life) at 23° C. of less than or equal to 70 seconds, or less than or equal to 50 seconds, or less than or equal to 40 seconds, depending on the photochromic dyes present.

The present invention also relates to an optical article that includes the photochromic composition according to the present invention. The optical articles can be prepared by art-recognized methods, such as by imbibition methods, cast-in-place methods, coating methods, in-mold coating methods, over-mold methods, and lamination methods.

For example, the optical articles can be selected from ophthalmic articles, display articles, windows, mirrors, active liquid crystal cell articles, and passive liquid crystal cell articles.

For example, the optical articles of the present invention can be ophthalmic articles, and the ophthalmic articles can be selected from corrective lenses, non-corrective lenses, contact lenses, intra-ocular lenses, magnifying lenses, protective lenses, and visors.

The present invention can be further characterized by one or more of the following non-limiting clauses.

Clause 1. A curable photochromic coating composition comprising a polyol component, wherein the polyol component comprises a first polyol having two hydroxyl groups and a hydroxyl equivalent weight of at least 15,000 g/mol and a second polyol having at least three hydroxyl groups and a hydroxyl equivalent weight of at least 300 g/mol; a poly(anhydride) having at least three cyclic anhydride groups; and a secondary crosslinker, wherein the secondary crosslinker is selected from the group consisting of a poly(carbodiimide), an oxazoline-functional material and mixtures thereof; and a photochromic material.

Clause 2. The curable photochromic coating composition of clause 1, wherein the first polyol (i) and the second polyol (ii) are each independently selected from the group consisting of a polyurethane polyol, a polyether polyol, a polyester polyol, a polycarbonate polyol, an acrylic polyol, a polydimethylsiloxane polyol, a poly(urea)urethane polyol, a polyamide polyol, copolymers thereof, and combinations thereof.

Clause 3. The curable photochromic coating composition of clause 1 or 2, wherein the first polyol (i) has a hydroxyl equivalent weight of less than 75,000 g/mol.

Clause 4. The curable photochromic coating composition of any of clauses 1 to 3, wherein the first polyol (i) comprises a thermoplastic polyurethane diol.

Clause 5. The curable photochromic coating composition of any of clauses 1 to 4, wherein the first polyol (i) comprises an aliphatic thermoplastic polyurethane with a Shore hardness of less than 90, as measured according to ASTM D2240.

Clause 6. The curable photochromic coating composition of any of clauses 1 to 5, wherein the first polyol (i) comprises a polycarbonate thermoplastic polyurethane polyol or a polyether thermoplastic polyurethane polyol.

Clause 7. The curable photochromic coating composition of any of clauses 1 to 6, wherein the second polyol (ii) has a hydroxyl equivalent weight of less than 8,000 g/mol.

Clause 8. The curable photochromic coating composition of any of clauses 1 to 7, wherein the second polyol (ii) comprises poly(caprolactone)triol, poly(caprolactone)tetraol, polycarbonate triol, polycarbonate tetraol, acrylic polyol, or mixtures thereof.

Clause 9. The curable photochromic coating composition of any of clauses 1 to 8, wherein the poly(anhydride) (b) has at least three cyclic anhydride groups per molecule.

Clause 10. The curable photochromic coating composition of any of clauses 1 to 9, wherein the poly(anhydride) (b) comprises a copolymer selected from the group consisting of a copolymer of maleic anhydride and a $C_2$-$C_{24}$ olefin, a copolymer of maleic anhydride and (meth)acrylate, a copolymer of maleic anhydride and styrene, and mixtures thereof.

Clause 11. The curable photochromic coating composition of any of clauses 1 to 10, wherein the poly(anhydride) (b) comprises a copolymer of maleic anhydride and a $C_{10}$-$C_{24}$ olefin, such as a copolymer of maleic anhydride and 1-octadecene.

Clause 12. The curable photochromic coating composition of any of clauses 1 to 11, wherein the poly(anhydride) (b) has a number average molecular weight in the range of 500 to 100,000 g/mol.

Clause 13. The curable photochromic coating composition of any of clauses 1 to 12, wherein the secondary crosslinker (c) comprises an oxazoline-functional material with at least three oxazoline groups.

Clause 14. The curable photochromic coating composition of any of clauses 1 to 13, wherein the secondary crosslinker (c) comprises an oxazoline-functional material comprising a copolymer of 2-isopropenyl-2-oxazoline.

Clause 15. The curable photochromic coating composition of any of clauses 1 to 14, wherein the photochromic material (d) is selected from the group consisting of naphthopyrans, benzopyrans, indenonaphthopyrans, indolenaphthopyrans, phenanthropyrans, spiropyrans, oxazines, mercury dithiozonates, fulgides, fulgimides, and mixtures thereof.

Clause 16. The curable photochromic coating composition of any of clauses 1 to 15, wherein the ratio of equivalents of anhydride groups present in the poly(anhydride) (b) to the equivalents of hydroxyl groups present in the polyol component (a) ranges from 1:3 to 5:1.

Clause 17. The curable photochromic coating composition of any of clauses 1 to 16, wherein the photochromic coating composition comprises (a) 25 to 79.9 weight percent polyol component; (b) 10 to 55 weight percent poly(anhydride); (c) 10 to 30 weight percent secondary crosslinker; and (d) 0.1 to 20 weight percent photochromic compound, where weight percentages are based on total solids present in the photochromic composition.

Clause 18. The curable photochromic coating composition of any of clauses 1 to 17, wherein the photochromic coating composition comprises a larger weight percent of the first polyol (i) than the second polyol (ii).

Clause 19. The curable photochromic coating composition of any of clauses 1 to 18, wherein the photochromic coating composition comprises from 30 to 60 weight percent of the first polyol (i) and from 10 to 30 percent of the second polyol (ii).

Clause 20. The curable photochromic coating composition of any of clauses 1 to 19, wherein the photochromic coating composition is substantially free, essentially free, or completely free of an isocyanate functional crosslinker.

Clause 21. The curable photochromic coating composition of any of clauses 1 to 20, wherein the photochromic coating composition has a Fischer micro-hardness value of at least 10 and less than 50 N/mm² when fully cured.

Clause 22. The curable photochromic coating composition of any of clauses 1 to 21, wherein the photochromic coating composition exhibits a $T_{1/2}$ (Fade Half Life) at 23° C. of less than or equal to 70 seconds.

Clause 23. The curable photochromic coating composition of any of clauses 1 to 22, wherein the first polyol is a diol.

Clause 24. The curable photochromic coating composition of any of clauses 1 to 23, wherein the second polyol is different from the first polyol.

Clause 25. An optical article comprising the curable photochromic coating composition of any of clauses 1-24.

Clause 26. The optical article of clause 25, wherein the optical article is a lens.

The present invention is more particularly described in the following examples, which are intended as illustrative only, since numerous modifications and variations therein will be apparent to those skilled in the art.

EXAMPLES

The following examples are provided to illustrate photochromic coating compositions of the invention. Part 1 provides descriptions of the syntheses of formulation components. Part 2 provides descriptions of the preparation of photochromic coating compositions of the invention and comparative photochromic coating compositions. Part 3 provides descriptions of the preparation of photochromic test specimens. Part 4 provides an evaluation of the properties of the photochromic coating compositions of the invention versus comparative photochromic coating compositions.

Part 1: Preparation of Formulation Components

Example 1

Polycaprolactone Tetraol

Pentaerythritol (6 g) and ε-caprolactone (126 g) were combined in a three-necked flask under nitrogen, and heated to 150° C. until homogeneous. Tin (II) octanoate (1 g) was added over 5 minutes resulting in an exotherm to 180° C. The flask was evacuated and purged with nitrogen three times, then stirred for 24 hours at 150° C. under nitrogen. To the cooled reaction mixture was added hexanes (3×300 mL), decanting the supernatant after each addition. The resulting viscous liquid was dried at 40° C. under vacuum to give a low melting white solid (yield: 107 g). A molecular weight of 3332 g/mol and hydroxyl equivalent weight of 833 g/mol were calculated by ¹H NMR.

Example 2

Polycaprolactone Triol 1,1,1-Tris(hydroxymethyl)propane (7.4 g) and ε-caprolactone (76 g) were combined in a three-necked flask under nitrogen, and heated to 150° C. until homogeneous. Tin (II) octanoate (0.83 g) was added over 5 minutes resulting in an exotherm to 180° C. The flask was evacuated and purged with nitrogen three times, then stirred for 24 hours at 150° C. under nitrogen. To the cooled reaction mixture was added hexanes (3×300 mL), decanting the supernatant after each addition. The resulting viscous liquid was dried at 40° C. under vacuum to give a low melting white solid (yield: 80 g). A molecular weight of 1502 g/mol and hydroxyl equivalent weight of 500 g/mol were calculated by ¹H NMR.

Example 3

Preparation of Acrylic Oxazoline-Functional Material

Dipropylene glycol methyl ether acetate ("DPMA", 31 g) was sparged with nitrogen for 15 minutes, then heated to 130° C. A solution of 2-isopropenyl-2-oxazoline (25 g), n-butyl methacrylate (32 g), 2,2'-azobis(2-methylbutyronitrile) (5.2 g), triphenylphosphite (0.29 g) and t-dodecylmercaptan (0.57 g) was added dropwise over 30 minutes. After stirring for 30 min, 0.5 g of 2,2'-Azobis(2-methylbutyronitrile) in 5 ml of DPMA was added and the solution stirred for another 30 minutes. An additional 0.5 g of 2,2'-Azobis(2-methylbutyronitrile) in 5 ml of DPMA was added and the solution stirred for another 30 minutes. The solution was then cooled to 50° C. and slowly added to hexanes (0.5 L) with stirring. The combined solution was cooled to room temperature. The solvent was decanted to yield a viscous liquid. The product was added to hexanes (0.5 L) and decanted a second time. The crude solid product was dried under vacuum at 50° C. Yield: 45 g. The Mw was 3610 g/mol and the number average molecular weight (Mn) of 2120 g/mol as determined by GPC with THF eluent against polystyrene standards. The calculated oxazoline equivalent weight was 292 g/mol based on ¹H NMR.

Part 2: Preparation of Photochromic Coating Compositions

Examples 4-9

Photochromic coating compositions employing an oxazoline-functional secondary crosslinker were prepared using the components listed in Table 1. All components are listed in parts per weight. For each coating composition shown in Table 1, the components of Charge 1 were combined and heated to 50° C. for a minimum of 30 minutes, or until the solids dissolved. Charge 2 was added, and stirring was continued at 50° C. for 30 minutes. The solution was cooled to room temperature followed by addition of charge 3. The mixture was stirred for one hour, followed by addition of Charge 4. The solution was stirred for a minimum of 10 hours at room temperature prior to use. All compositions were formulated to 30 percent theoretical solids.

TABLE 1

|  | Ex.4 | Ex. 5 | Ex. 6 | Ex. 7 | Ex. 8 | Ex. 9 |
|---|---|---|---|---|---|---|
| Charge 1 |  |  |  |  |  |  |
| Photochromic dyes[1] | 9.00 | 9.00 | 9.00 | 9.00 | 9.00 | 9.00 |
| TINUVIN ® 144[2] | 2.04 | 2.00 | 2.00 | 2.04 | 2.00 | 2.00 |
| IRGANOX ® 245[3] | 2.00 | 2.00 | 2.00 | 2.00 | 2.00 | 2.00 |
| (3-Glycidoxypropyl) trimethoxysilane | 4.50 | 4.50 | 4.50 | 4.50 | 4.50 | 4.50 |
| BYK ® 333[4] | 0.08 | 0.08 | 0.08 | 0.08 | 0.08 | 0.08 |
| N-methyl-2-pyrrolidone | 263.8 | 274.35 | 274.37 | 263.8 | 274.35 | 274.37 |
| Charge 2 |  |  |  |  |  |  |
| Poly(maleic anhydride-alt-1-octadecene)[5] | 17.7 | 12.4 | 15.9 | 17.7 | 12.4 | 15.9 |
| Oxazoline-functional material of Example 3 | 14.5 | 10.2 | 13.0 | 14.5 | 10.2 | 13.0 |
| Charge 3 |  |  |  |  |  |  |
| Acrylic polyol[6] | 27.9 | — | — | 27.9 | — | — |
| Polyol of Example 1 | — | 27.3 | — | — | 27.3 | — |
| Polyol of Example 2 | — | — | 21.0 | — | — | 21.0 |
| Charge 4 |  |  |  |  |  |  |
| Tecoflex ™ SG-80A[7] | 50.6 | 50.0 | 50.1 | — | — | — |
| Carbothane ™ PC-3575A[8] | — | — | — | 50.6 | 50.0 | 50.1 |

[1] A blend of photochromic indenonaphthopyran dyes formulated to give a grey color on activation.
[2] A hindered amine light stabilizer, commercially available from BASF.
[3] An antioxidant commercially available from BASF.
[4] A polyether modified dimethylpolysiloxane copolymer, available from BYK-Chemie.
[5] Free flowing powder with average Mn of 30,000-50,000 g/mol, equivalent weight 351 g/mol, available from Sigma-Aldrich, Inc.
[6] Prepared by free radical polymerization of hydroxypropyl methacrylate (40.4 percent), Butyl methacrylate (57.6 percent) and Acrylic acid (2.0 percent) with a number average molecular weight (Mn) of 5,500 as determined by GPC with polystyrene standards and tetrahydrofuran eluent. Hydroxyl Equivalent weight (on solids) of 360 g/mol. Material reduced to 61.5 percent solids using DPMA.
[7] A polyether based thermoplastic polyurethane (TPU) diol with reported Mn of 53,000 g/mol and calculated hydroxyl equivalent weight of 26,500 g/mol. Available from The Lubrizol Corporation.
[8] A polycarbonate based TPU diol available from The Lubrizol Corporation. The material used had an Mn of 39,460 g/mol as determined by GPC-TD-MALS/RI/VIS analysis using THF eluent, corresponding to a calculated hydroxyl equivalent weight of 19,730 g/mol.

Examples 10 and 11

Photochromic compositions employing a polycarbodiimide secondary crosslinker were prepared using the components listed in Table 2, using the procedures of Examples 4 through 9 above. Both compositions were formulated to 30 percent theoretical solids.

TABLE 2

|  | Ex. 10 | Ex. 11 |
|---|---|---|
| Charge 1 |  |  |
| Photochromic dyes | 9.00 | 9.00 |
| TINUVIN 144 | 2.00 | 2.00 |
| IRGANOX 245 | 2.00 | 2.00 |
| (3-Glycidoxypropyl) trimethoxysilane | 4.50 | 4.50 |
| BYK 333 | 0.08 | 0.08 |
| N-methyl-2-pyrrolidone | 266.03 | 266.03 |
| Charge 2 |  |  |
| Poly(maleic anhydride-alt-1-octadecene) | 13.7 | 13.7 |
| Charge 3 |  |  |
| Acrylic polyol | 21.6 | 21.6 |
| CARBODILITE ® V-02B[9] | 23.1 | 23.1 |
| Charge 4 |  |  |
| Tecoflex SG-80A | 50.0 | — |
| Carbothane | — | 50.0 |

[9] A polycarbodiimide with an average carbodiimide equivalent weight of 600 g/mol. Available from Nisshinbo Chemical Inc.

Comparative Examples CE1 and CE2

Comparative Example 1 (CE1) does not include a first polyol (i) having two hydroxyl groups and a hydroxyl equivalent weight of at least 15,000 g/mol. CE1 was prepared as described for Examples 4 through 9, using an equimolar amount of low hydroxyl equivalent weight diol in place of the high hydroxyl equivalent weight TPU diol, and an oxazoline-functional secondary crosslinker. Comparative Example 2 (CE2) does not include the secondary crosslinker (c) or the second polyol (ii) having at least three hydroxyl groups and a hydroxyl equivalent weight of at least 300 g/mol. CE2 was prepared as described for Examples 4 through 9 using a formulation with only a TPU diol as the polyol component, and no secondary crosslinker. Formulation details are provided in Table 3.

TABLE 3

| | Comparative Examples | |
|---|---|---|
|  | CE1 | CE2 |
| Charge 1 |  |  |
| Photochromic dyes | 9.00 | 3.03 |
| TINUVIN ® 144 | 2.00 | 2.03 |
| IRGANOX ® 245 | 2.00 | 2.02 |
| (3-Glycidoxypropyl) trimethoxysilane | 4.50 | — |
| BYK ® 333 | 0.08 | — |
| N-methyl-2-pyrrolidone | 63.69 | — |
| Tetrahydrofuran | — | 427.95 |

TABLE 3-continued

Comparative Examples

|  | CE1 | CE2 |
|---|---|---|
| Charge 2 | | |
| Poly(maleic anhydride-alt-1-octadecene) | 34.9 | 2.6 |
| Polyoxazoline of Example 3 | 28.7 | — |
| Charge 3 | | |
| Acrylic polyol | 55.2 | — |
| PolyTHF ® 1000[10] | 2.4 | — |
| Charge 4 | | |
| Tecoflex ™ SG-80A | — | 97.4 |
| Total solids (theory) | 58% | 20% |

[10]Diol available from BASF, with hydroxy equivalent weight 500 g/mol.

Part 3: Preparation of Photochromic Test Specimens

The compositions of Examples 4 through 11, CE1 and CE2 were applied to PDQ® coated Gentex® polycarbonate plano lenses, each having a diameter of 76 millimeters. Prior to coating, each lens was treated with oxygen plasma at a flow rate of 100 milliliters (mL) per minute of oxygen at 100 watts of power for three minutes. About 1-2 mL of each composition was dispensed onto the substrate and then rotated for eight seconds at a spin speed sufficient to deposit 0.6-0.65 g of wet coating (30 percent solids) for Examples 4 through 11, 0.3-0.33 g of wet coating for CE1, and 0.9 g of wet coating for CE2 onto the lens.

The test specimens of Examples 4 through 11 were prepared in duplicate then cured at 125° C. in a forced air oven for four hours. Comparative Example CE1 was cured for one hour at 125° C., and Comparative Example CE2 was cured for six hours at 125° C.

Part 4: Properties of Test Specimens

Part 4a. Micro-Hardness Evaluation

One set of test specimens were subjected to an additional thermal cure for three hours at 105° C. and then subjected to micro-hardness testing using a Fischerscope HCV, Model H100SMC available from Fischer Technology, Inc. The hardness was measured at a penetration depth of 2 microns after a 100 milliNewton load for 15 seconds. Each test specimen was measured at least twice and the resulting data was averaged.

Part 4b. Photochromic Performance

The second set of test specimens were further treated with oxygen plasma as previously described and spin coated with a protective coating according to the formulation reported in Table 1 of Example 1 in U.S. Pat. No. 7,410,691. The test specimens were cured under a nitrogen atmosphere with UV light from D bulbs. Following this, each test specimen was thermally cured at 105° C. for three hours.

The photochromic performance of the test specimens was tested on the Bench for Measuring Photochromics ("BMP") made by Essilor, Ltd. France. The BMP was maintained at a constant temperature of 73.4° F. (23° C.) during testing. Prior to testing, each of the coated test specimens were exposed to 365-nanometer ultraviolet light for about 10 minutes at a distance of about 14 centimeters to activate the photochromic materials. The UVA (315 to 380 nm) irradiance at the lens was measured with a LICOR® Model Li-1800 spectroradiometer and found to be 22.2 watts per square meter. Each test specimen was then placed under a 500 watt, high intensity halogen lamp for about 10 minutes at a distance of about 36 centimeters to bleach (inactivate) the photochromic materials. The illuminance at the specimen was measured with the LICOR® spectroradiometer and found to be 21.9 Klux. Each test specimen was then kept in a dark environment at room temperature (from 70 to 75° F., or 21 to 24° C.) for at least one hour prior to testing on the BMP. Prior to measurement, each lens was measured for ultraviolet absorbance at 390 nanometers (Abs 390 nm).

The BMP optical bench was fitted with two 150-watt Newport Model #6255 Xenon arc lamps set at right angles to each other. The light path from Lamp 1 was directed through a 3 mm SCHOTT® KG-2 band-pass filter and appropriate neutral density filters that contributed to the required UV and partial visible light irradiance level. The light path from Lamp 2 was directed through a 3 mm SCHOTT® KG-2 band-pass filter, a SCHOTT® short band 400 nm cutoff filter and appropriate neutral density filters in order to provide supplemental visible light illuminance. A 2 inch×2 inch 50 percent polka dot beam splitter set at 45° to each lamp is used to mix the two beams. The combination of neutral density filters and voltage control of the Xenon arc lamp were used to adjust the intensity of the irradiance. Software, i.e., BMPSoft version 2.1e, was used on the BMP to control timing, irradiance, air cell and sample temperature, shuttering, filter selection, and response measurement. A ZEISS® spectrophotometer, Model MCS 601, with fiber optic cables for light delivery through the lens was used for response and color measurement. Photopic response measurements were collected on each lens.

The power output of the optical bench, i.e., the dosage of light that the lens was exposed to, was adjusted to 6.7 watts per square meter (W/m$^2$) UVA, integrated from 315-380 nm, and 50 Klux illuminance, integrated from 380-780 nm. Measurement of this power set point was made using an irradiance probe and the calibrated Zeiss spectrophotometer. The lens sample cell was fitted with a quartz window and self-centering sample holder. The temperature in the sample cell was controlled at 23° C. through the software with a modified Facis, Model FX-10, environment simulator. Measurement of the sample's dynamic photochromic response and color measurements were made using the same Zeiss spectrophotometer with fiber optic cables for light delivery from a tungsten halogen lamp through the sample. The collimated monitoring light beam from the fiber optic cable was maintained perpendicular to the test sample while passing through the sample and directed into a receiving fiber optic cable assembly attached to the spectrophotometer. The exact point of placement of the sample in the sample cell was where the activating xenon arc beam and the monitoring light beam intersected to form two concentric circles of light. The angle of incidence of the xenon arc beam at the sample placement point was ≈30° from perpendicular.

Response measurements, in terms of a change in optical density (ΔOD) from the unactivated or bleached state to the activated or colored state were determined by establishing the initial unactivated transmittance, opening the shutter from the Xenon lamp(s) and measuring the transmittance through activation at selected intervals of time. Change in optical density was determined according to the formula: ΔOD=$\log_{10}$(% $T_b$/% $T_a$), where % $T_b$ is the percent transmittance in the bleached state and % $T_a$ is the percent transmittance in the activated state. Optical density measurements were based on photopic optical density.

Part 4c. Results

The results of the micro-hardness and photochromic performance are shown in Table 4. The ΔOD at saturation was after 15 minutes of activation and the Fade Half Life ("T½") value is the time interval in seconds for the ΔOD of the activated form of the photochromic material in the coating to reach one half the fifteen-minute ΔOD at 73.4° F. (23° C.), after removal of the activating light source.

TABLE 4

| Example | Fischer micro-hardness (N/mm$^2$) | ΔOD | T½ @ Photopic (seconds) |
|---------|-----------------------------------|------|-------------------------|
| 4       | 20                                | 0.83 | 35                      |
| 5       | 15                                | 0.81 | 29                      |
| 6       | 16                                | 0.82 | 30                      |
| 7       | 24                                | 0.80 | 41                      |
| 8       | 18                                | 0.79 | 31                      |
| 9       | 20                                | 0.78 | 31                      |
| 10      | 14                                | 0.70 | 62                      |
| 11      | 17                                | 0.72 | 63                      |
| CE1     | 110                               | 0.58 | 358                     |
| CE2     | 3                                 | 0.64 | 28                      |

As shown in Table 4, the photochromic coatings of the present invention exhibited superior photochromic performance (good darkness combined with good fade rate) in combination with acceptable hardness. In contrast, a photochromic coating composition that does not include the first polyol (i) of the present invention resulted in a very hard film, but very slow fade (CE1). A photochromic coating composition that does not include the secondary crosslinker (c) or the second polyol (ii) of the present invention demonstrates that the TPU diol and anhydride alone gives good fade speed but at the expense of the film hardness (CE2).

The present invention has been described with reference to specific details of particular embodiments thereof. It is not intended that such details be regarded as limitations upon the scope of the invention except insofar as to the extent that they are included in the accompanying claims.

What is claimed is:

1. A curable photochromic coating composition comprising:
    (a) a polyol component, wherein the polyol component comprises:
        (i) a first polyol having two hydroxyl groups and a hydroxyl equivalent weight of at least 15,000 g/mol; and
        (ii) a second polyol different from the first polyol, said second polyol having at least three hydroxyl groups and a hydroxyl equivalent weight of at least 300 g/mol;
    (b) a polyanhydride having at least three cyclic anhydride groups;
    (c) a secondary crosslinker, wherein the secondary crosslinker is selected from the group consisting of a polycarbodiimide, an oxazoline-functional material, and mixtures thereof; and
    (d) a photochromic material.

2. The curable photochromic coating composition of claim 1, wherein the first polyol (i) and the second polyol (ii) are each independently selected from the group consisting of a polyurethane polyol, a polyether polyol, a polyester polyol, a polycarbonate polyol, an acrylic polyol, a polysiloxane polyol, a poly(urea)urethane polyol, a polyamide polyol, copolymers thereof, and combinations thereof.

3. The curable photochromic coating composition of claim 1, wherein the first polyol (i) has a hydroxyl equivalent weight of less than 75,000 g/mol.

4. The curable photochromic coating composition of claim 1, wherein the first polyol (i) comprises a thermoplastic polyurethane diol.

5. The curable photochromic coating composition of claim 1, wherein the second polyol (ii) has a hydroxyl equivalent weight of less than 8,000 g/mol.

6. The curable photochromic coating composition of claim 1, wherein the second polyol (ii) comprises polycaprolactone triol, polycaprolactone tetraol, polycarbonate triol, polycarbonate tetraol, acrylic polyol, or mixtures thereof.

7. The curable photochromic coating composition of claim 1, wherein the polyanhydride (b) comprises a copolymer selected from the group consisting of:
    a copolymer of maleic anhydride and a $C_2$-$C_{24}$ olefin,
    a copolymer of maleic anhydride and (meth)acrylate,
    a copolymer of maleic anhydride and styrene,
    and mixtures thereof.

8. The curable photochromic coating composition of claim 1, wherein the polyanhydride (b) has a number average molecular weight in the range of 500 to 100,000 g/mol.

9. The curable photochromic coating composition of claim 1, wherein the secondary crosslinker (c) comprises an oxazoline-functional material with at least three oxazoline groups.

10. The curable photochromic coating composition of claim 1, wherein the photochromic material (d) is selected from the group consisting of naphthopyrans, benzopyrans, indenonaphthopyrans, indolonaphthopyrans, phenanthropyrans, spiropyrans, spirooxazines, mercury dithiozonates, fulgides, fulgimides, and mixtures thereof.

11. The curable photochromic coating composition of claim 1, wherein the ratio of equivalents of anhydride groups present in polyanhydride (b) to the equivalents of hydroxyl groups present in the polyol component (a) ranges from 1:3 to 5:1.

12. The curable photochromic coating composition of claim 1, wherein the photochromic coating composition comprises:
    (a) 25 to 79.9 weight percent polyol component;
    (b) 10 to 55 weight percent polyanhydride;
    (c) 10 to 30 weight percent secondary crosslinker; and
    (d) 0.1 to 20 weight percent photochromic compound,
    where weight percentages are based on total solids present in the photochromic composition.

13. An optical article comprising the curable photochromic coating composition of claim 1.

14. The optical article of claim 13, wherein the optical article is a lens.

* * * * *

UNITED STATES PATENT AND TRADEMARK OFFICE
CERTIFICATE OF CORRECTION

PATENT NO. : 12,163,045 B2
APPLICATION NO. : 17/638349
DATED : December 10, 2024
INVENTOR(S) : Reddy et al.

It is certified that error appears in the above-identified patent and that said Letters Patent is hereby corrected as shown below:

In the Claims

Column 30, Line 40, Claim 10, delete "dithiozonates," and insert -- dithizonates, --

Signed and Sealed this
Eleventh Day of February, 2025

Coke Morgan Stewart
*Acting Director of the United States Patent and Trademark Office*